United States Patent
Thompson (10) Patent No.: US 12,317,771 B2
(45) Date of Patent: Jun. 3, 2025

(54) AGITATOR DRIVE SYSTEM FOR A PRODUCT METERING SYSTEM

(71) Applicant: CNH Industrial Canada, Ltd., Saskatoon (CA)

(72) Inventor: Dennis George Thompson, Eagle Ridge (CA)

( * ) Notice: Subject to any disclaimer, the term of this patent is extended or adjusted under 35 U.S.C. 154(b) by 200 days.

(21) Appl. No.: 17/947,854

(22) Filed: Sep. 19, 2022

(65) Prior Publication Data
US 2024/0090367 A1    Mar. 21, 2024

(51) Int. Cl.
A01C 15/00    (2006.01)

(52) U.S. Cl.
CPC .................................. *A01C 15/007* (2013.01)

(58) Field of Classification Search
None
See application file for complete search history.

(56) References Cited

U.S. PATENT DOCUMENTS

| | | | |
|---|---|---|---|
| 5,709,322 A * | 1/1998 | Ricciardi | G01F 13/005 222/413 |
| 5,996,515 A | 12/1999 | Gregor et al. | |
| 8,166,895 B2 | 5/2012 | Dean et al. | |
| 8,931,425 B2 | 1/2015 | Friggstad | |
| 9,681,602 B2 | 6/2017 | Montag et al. | |
| 9,804,608 B2 | 10/2017 | Chahley et al. | |
| 9,901,022 B2 | 2/2018 | Schumacher et al. | |
| 10,085,376 B1 | 10/2018 | Boily et al. | |
| 10,649,474 B2 | 5/2020 | Schoeny et al. | |
| 10,939,610 B2 * | 3/2021 | Kowalchuk | A01C 15/007 |
| 11,337,365 B2 | 5/2022 | Stuart et al. | |
| 2020/0081457 A1 | 3/2020 | Engel et al. | |
| 2020/0245536 A1 | 8/2020 | Erker | |
| 2020/0246769 A1 | 8/2020 | Pidwerbesky et al. | |
| 2021/0282314 A1 | 9/2021 | Ruppert et al. | |
| 2021/0298226 A1 | 9/2021 | Garner et al. | |

FOREIGN PATENT DOCUMENTS

WO    2008150240 A1    12/2008

OTHER PUBLICATIONS

APV America | Multi-Metering Systems | MDD 40 M1, 2021, pp. 1-7, https://www.apv-america.com/products/seeding-spreading/multi-metering-disc-mddmdp/mdd-40-m1-mdd-100-m1/.

* cited by examiner

*Primary Examiner* — William R Harp
(74) *Attorney, Agent, or Firm* — Rebecca Henkel; Peter K. Zacharias; Rickard K. DeMille (57) ABSTRACT

An agitation system includes a plurality of modular agitators, and each modular agitator of the plurality of modular agitators includes an agitator configured to couple to a respective modular meter of a plurality of modular meters. Each modular agitator of the plurality of modular agitators also includes an agitator drive assembly configured to drive the agitator. The agitation system also includes a controller configured to receive meter speed data from the plurality of modular meters. The controller is configured to determine an operation for the agitator of each of the plurality of modular agitators and independently control the agitator drive assembly of each of the plurality of modular agitators.

20 Claims, 7 Drawing Sheets

AGITATOR DRIVE SYSTEM FOR A PRODUCT METERING SYSTEM

BACKGROUND

The present disclosure relates generally to a product metering system with an agitator drive system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are towed behind a work vehicle, such as a tractor. These implements may store agricultural product, such as seeds, fertilizer, and/or other agricultural product, which is distributed on or in the ground using various methods. Certain implements include a storage compartment in which the agricultural product is stored and a metering system configured to meter the agricultural product from the storage compartment. The agricultural product is distributed from the metering system to row units, which are configured to distribute the agricultural product on or in the ground. As the storage compartment is filled with the agricultural product and/or while the agricultural product flows from the storage compartment to the metering system, the agricultural product may form an undesirable profile within the storage compartment. This undesirable profile may lead to uneven flow to the metering system, which may cause an unwanted distribution or no distribution of the agricultural product over and/or within certain regions of a field. As a result, the crop yield within these regions may be reduced, thereby reducing the efficiency of the seeding process.

Some agricultural seeding implements include an agitation system having a long agitation shaft driven by a single motor. An agitator of the agitation system may be coupled to the long agitation shaft, and the agitator may be driven to rotate by the single motor, thereby agitating the agricultural product. In addition, the metering system may include multiple modular meters, and the number of modular meters within the metering system may be selected based on the type of agricultural operation, the number of row units within the seeding implement, other suitable parameters, or a combination thereof. The agitator may be disposed within the storage compartment above the modular meters, and the agitator may extend across an inlet of each modular meter. The single motor of the agitation system may be sized for the maximum number of modular meters regardless of how many are installed on a particular seeding implement. As a result, resources, energies, and the like may not be used efficiently.

SUMMARY

In certain embodiments, an agitation system includes a plurality of modular agitators, and each modular agitator of the plurality of modular agitators includes an agitator configured to be aligned with an inlet of a respective modular meter of a plurality of modular meters. Each modular agitator of the plurality of modular agitators also includes an agitator drive assembly configured to drive the agitator to operate independently of a meter of the respective modular meter. The agitation system also includes a controller having a memory and a processor. The controller is configured to receive meter speed data from the plurality of modular meters, and the meter speed data include a meter speed for each meter of the plurality of modular meters. The controller is also configured to determine an operation for the agitator of each of the plurality of modular agitators at least in part based on the meter speed data and independently control the agitator drive assembly of each of the plurality of modular agitators to operate the respective agitator in the respective determined operation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
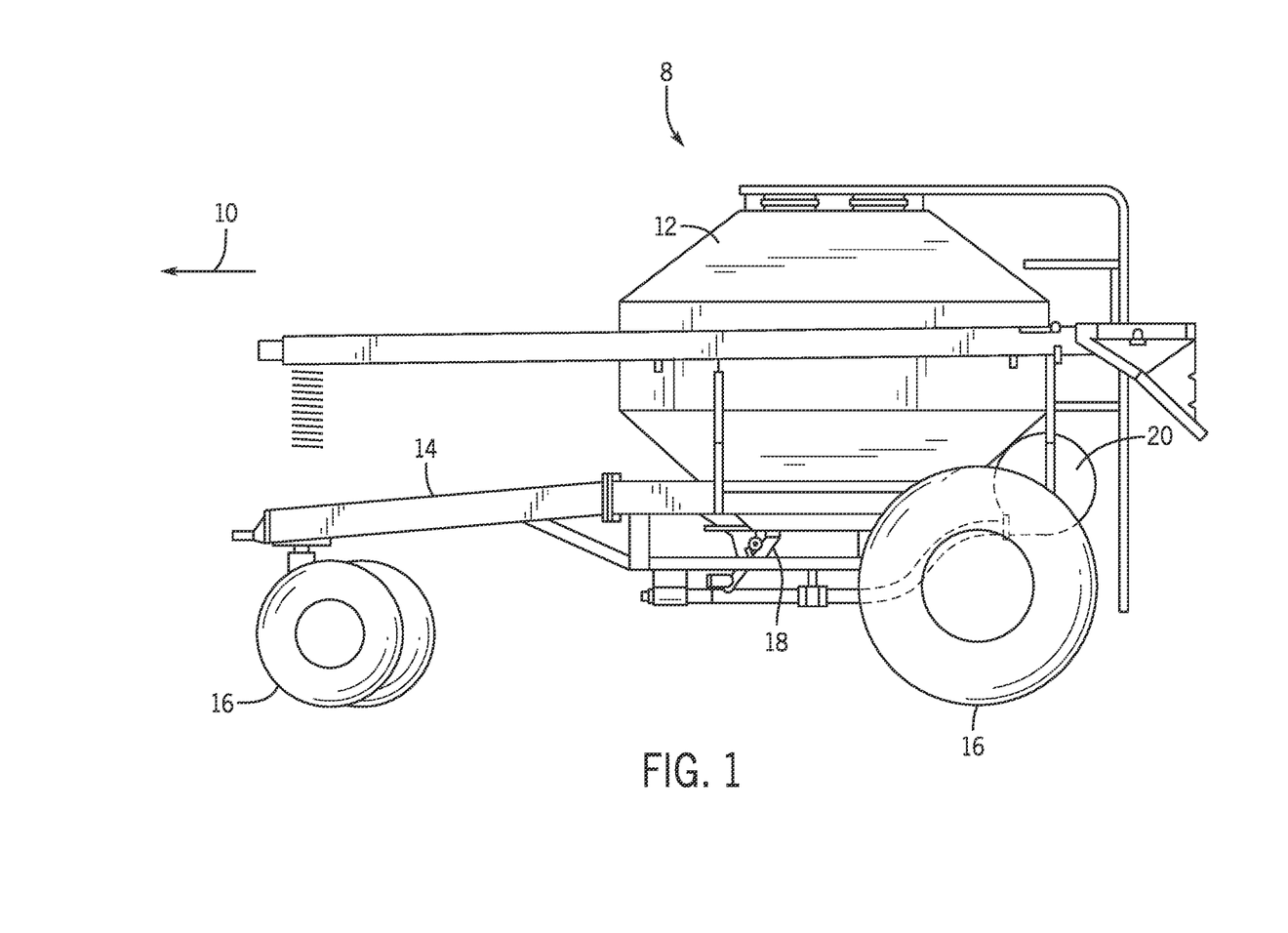
FIG. 1 is a side view of an embodiment of an air cart, including a metering system configured to regulate a flow of agricultural product, in accordance with an aspect of the present disclosure.

FIG. 1 is a side view of an embodiment of an air cart 8 that may be used in conjunction with a towable agricultural implement to deposit agricultural product into soil. For example, certain agricultural implements include row units configured to open the soil, dispense agricultural product into the soil opening, and re-close the soil. Such implements are generally coupled to a tow vehicle, such as a tractor, and pulled through a field. In certain configurations, agricultural product is conveyed to the row units by the illustrated air cart 8, which is generally towed in sequence with the implement along a direction of travel 10 (e.g., behind the implement or in front of the implement). The agricultural product may include seed, fertilizer, other suitable agricultural product(s), or a combination thereof.

In the illustrated embodiment, the air cart 8 includes a storage compartment 12, a frame 14, wheels 16, a metering system 18, and an air source 20. In certain configurations, the air cart 8 includes multiple compartments for storing various agricultural products. For example, one compartment may include seeds, such as canola or mustard, and another compartment may include a dry fertilizer. In such configurations, the air cart 8 is configured to deliver both the seeds and the fertilizer to the implement. The frame 14 includes a towing hitch configured to couple to the implement or the tow vehicle. As discussed in detail below, the agricultural product within the storage compartment 12 is gravity fed into the metering system 18. The metering system 18 includes one or more meter rollers that regulate the flow of agricultural product from the storage compartment 12 into an air flow provided by the air source 20. The air flow then carries the agricultural product to the implement by pneumatic conduits. In this manner, the row units receive a supply of the agricultural product for deposition within the soil.

Figure 2:
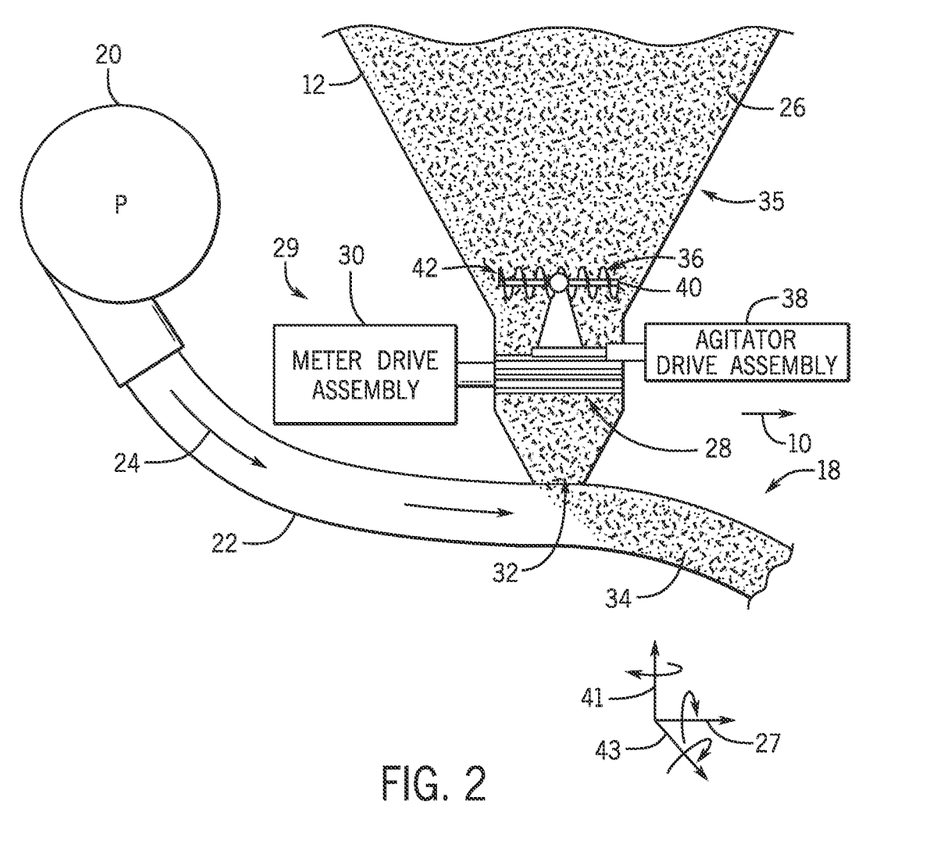
FIG. 2 is a schematic diagram of an embodiment of a metering system with a meter drive assembly and an embodiment of an agitation system with an agitator drive assembly, in accordance with an aspect of the present disclosure.

FIG. 2 is a schematic diagram of an embodiment of a metering system 18, which may be employed within the air cart of FIG. 1. As illustrated, the air source 20 is coupled to a conduit 22 configured to guide an air flow 24 to pass through the metering system 18. The air source 20 may include a pump or blower powered by an electric or hydraulic motor, for example. Agricultural product 26 (e.g., seed, fertilizer, etc.) within the storage compartment 12 flows by gravity into the metering system 18. The metering system 18 includes one or more meter rollers 28 configured to regulate the flow of the agricultural product 26 into the air flow 24. In certain embodiments, the metering system 18 may include multiple modular meters 29, in which each modular meter includes a respective meter roller 28 rotating about a longitudinal axis 27 and a respective meter box configured to house the respective meter roller 28. By independently adjusting the rotation speed of each meter roller 28, agricultural product flow to different sections of the implement may be particularly controlled.

In the illustrated embodiment, each meter roller 28 of the metering system 18 is coupled to a respective meter drive assembly 30 configured to drive the corresponding meter roller 28 to rotate. That is, the metering system 18 includes one drive assembly per modular meter 29. In certain embodiments, the meter drive assembly 30 includes at least one drive unit, such as an electric or hydraulic motor, configured to drive one or more meter rollers to rotate. For example, in certain embodiments, multiple drive units may be coupled to respective meter rollers to facilitate independent control of the rotation rates of the meter rollers. For a particular meter roller configuration/profile, the rotation rate of the meter roller 28 controls the flow of the agricultural product 26 into the air flow 24. In further embodiments, the meter drive assembly 30 may be coupled to a wheel (e.g., via a gear assembly) such that rotation of the wheel drives the meter roller 28 to rotate. Such a configuration automatically varies the rotation rate of the meter roller 28 based on the speed of the air cart.

In the illustrated embodiment, the rotation axis of the meter roller 28 is oriented substantially parallel to the direction of travel 10 of the air cart, accordingly, the longitudinal axis 27 is substantially parallel to the direction of travel 10. As used herein, substantially parallel to the direction of travel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 10). By way of example, substantially parallel to the direction of travel may refer to an angle less than 5 degrees, less than 4 degrees, less than 3 degrees, less than 2 degrees, less than 1 degree, or less than 0.5 degrees relative to an axis/direction. In further embodiments, the rotation axis of the meter roller 28 may be oriented substantially perpendicular to the direction of travel 10, or at any other suitable angle, accordingly, the longitudinal axis 27 may be perpendicular to the direction of travel 10, or at any other suitable angle. In certain embodiment, the rotation axes of different modular meters 29 in the metering system 18 may be oriented in different directions.

For a particular meter roller configuration/profile of the metering system 18, the rotation rate of the meter roller 28 controls the flow of the agricultural product 26 into the air flow 24. For example, as the meter roller 28 rotates, the meter roller meters the agricultural product through an opening 32 in the metering system 18 into a respective conduit 22 (e.g., into a conduit associated with a respective row unit or group of row units). The agricultural product then mixes with air from the air source 20, thereby forming an air/agricultural product mixture 34. The mixture then flows to the respective row unit(s) of the implement via pneumatic conduit(s), where the agricultural product (e.g., seed and/or fertilizer) is deposited within the soil. Other modular meters 29 of the metering system 18 function in the same way as described above.

An agitation system 35 includes multiple modular agitators 36, and each modular agitator 36 is associated with a respective modular meter 29. In the illustrated embodiment, one modular agitator 36 includes an agitator drive assembly 38, a shaft 40, and an agitator 42 (e.g., coil agitator). The agitator 42 is coupled to the shaft 40, and the shaft 40 is coupled to the agitator drive assembly 38. The agitator drive assembly 38 is configured to drive the shaft 40 to move (e.g., rotate), thereby driving the agitator 42 to move (e.g., rotate). In certain embodiments, each agitator drive assembly 38 includes at least one drive unit, such as an electric or a hydraulic motor, configured to drive the agitator 42 to move. Accordingly, the agitators 42 of the modular agitators 36 may be independently controlled. Furthermore, in certain embodiments, the agitator drive assembly 38 may be coupled to a wheel of the air cart/agricultural implement (e.g., via a gear assembly) such that rotation of the wheel drives the respective agitator 42 to move. Such a configuration automatically varies the motion of the agitator(s) based on the speed of the air cart.

In certain embodiments, the agitators 42 of multiple modular agitators 36 are disposed within the storage compartment 12, and each agitator 42 is positioned above a meter roller 28 of a respective modular meter 29 along a vertical axis 41 perpendicular to the rotation axis of the meter roller 28 (e.g., the longitudinal axis 27). The agitators 42 may be oriented at one or more angles relative to the direction of travel 10, and/or the agitators 42 may be positioned at one or more vertical positions (i.e., positions along the vertical axis 41) within the storage compartment 12. For example, in certain embodiments, the agitators 42 may be parallel to one another and located at the same vertical position. By way of further example, at least two agitators may be oriented at different angles relative to the direction of travel 10, and/or at least two agitators may be located at different vertical positions along the vertical axis 41 within the storage compartment. The motion of the agitator 42 facilitates flow of the agricultural product 26 into the respective modular meter (e.g., by breaking up clumps of agricultural product and/or by moving agricultural product in the storage compartment toward the respective modular meter). For example, as the agricultural product 26 rests in the storage compartment, the agricultural product 26 may clump together to form pieces that are larger than desired (e.g., larger than an inlet to the modular meter), and/or the agricultural product 26 may be unevenly distributed in the storage compartment 12. As the agricultural product 26 flows through the moving (e.g., rotating) agitator 42, the clumps of the agricultural product 26 break into smaller pieces more suitable for flowing through the modular meter. In addition, the modular agitators 36 may more evenly distribute the agricultural product 26 by moving the agricultural product around in the storage compartment 12. For example, the modular agitators 36 may spread the unevenly distributed agricultural product 26 and redistribute the agricultural product within the storage compartment 12.

Different agricultural products 26 may include particles of different sizes. For example, seeds, such as sunflower, may have a coarse particle size, fertilizer, such as monoammonium phosphate (MAP), may have a medium particle size, and inoculant, such as a granular microbial soil inoculant, may have a fine particle size. Moreover, the target application rate may vary based on the type of agricultural product being dispensed. For example, the target flow rate of certain seeds or fertilizers may be higher than the target flow rate of other seeds or fertilizers. Accordingly, certain agricultural systems (e.g., air carts, agricultural implements) may facilitate removal and replacement of the modular agitators, thereby enabling an operator to select a modular agitator suitable for a particular agricultural product and for a target dispensing rate (e.g., a target rate for particular field conditions, etc.).

As previously discussed, the modular agitator 36 includes an agitator 42 coupled to the shaft 40. In the illustrated embodiment, the agitator 42 includes a coil wrapped around the shaft 40 and configured to enable the agricultural product 26 to flow between the shaft 40 and the coil. While the agitator 42 includes a coil wrapped in a helical form around the shaft 40 in the illustrated embodiment, in additional or alternative embodiments, the agitator may be wrapped around the shaft in a cylindrical form, in a conical form, in another suitable form, or any combination thereof. Additionally or alternatively, the agitator may include fingers or protrusions that extend from the shaft, in which movement of the fingers or protrusions induces movement of the agricultural product 26. The agitator may include a certain configuration of fingers or protrusions, such as a concentration (e.g., a number per unit length) of fingers or protrusions, a length of each finger or protrusion, a shape of each finger or protrusion, a position of the fingers or protrusions, and so forth, that may vary along the length of the shaft. Furthermore, the agitator may include multiple coils coupled to the shaft at different locations along the length of the shaft. In the illustrated embodiment, the agitator 42 is configured to rotate to move the agricultural product 26 within the storage compartment 12. The agitator 42 may be configured to rotate about one axis or about multiple axes concurrently to move the agricultural product 26. The agitators of the modular agitators 36 in the agitation system 35 may be of the same type or of different types. In certain embodiments, at least one modular agitator may include other type(s) of agitator(s) (e.g., alone or in combination with any of the agitator configuration(s) disclosed herein). Furthermore, in certain embodiments, the agitator may be driven to oscillate or move linearly (e.g., alone or in combination with rotational movement) within the storage compartment 12 (e.g., along a single axis or along multiple axes) to move the agricultural product 26. The agitators of the modular agitators 36 in the agitation system 35 may move in the same manner or different manners.

The agitator drive assembly 38 may be configured to drive the agitator 42 to move, such as via a motor (e.g., an electric motor, hydraulic motor, etc.). As the agitator 42 moves, the agitator 42 drives the agricultural product 26 to move within the storage compartment 12. In certain embodiments, the agitator drive assembly 38 may be configured to move the agitator 42 along the vertical axis 41 to different vertical positions within the storage compartment 12. Additionally or alternatively, the agitator drive assembly 38 may be configured to shift the agitator 42 along a lateral axis 43 and/or along the longitudinal axis 27 to different longitudinal/lateral locations within the storage compartment 12. In certain embodiments, the agitator drive assembly 38 may be controlled (e.g., automatically or by the operator) to move the agitator 42 to different locations in the storage compartment 12 based on the type of agricultural product 26 and/or the state of the agricultural product 26 (e.g., size of clumps or piles, location of piles, etc.) within the storage compartment 12. In certain embodiments, the agitator drive assembly 38 may be controlled (e.g., automatically or by the operator) to operate the agitator 42 based on sensor data from one or more sensors (e.g., location sensor(s), motion sensor(s), weight sensor(s), sound sensor(s), image sensor(s), flow rate sensor(s), and the like). For example, certain air carts/agricultural implements may include sensor(s) disposed within the storage compartment 12, the opening 32, the conduit 22, other part(s) of the system, or a combination thereof, to monitor the agricultural product 26.

Figure 3:
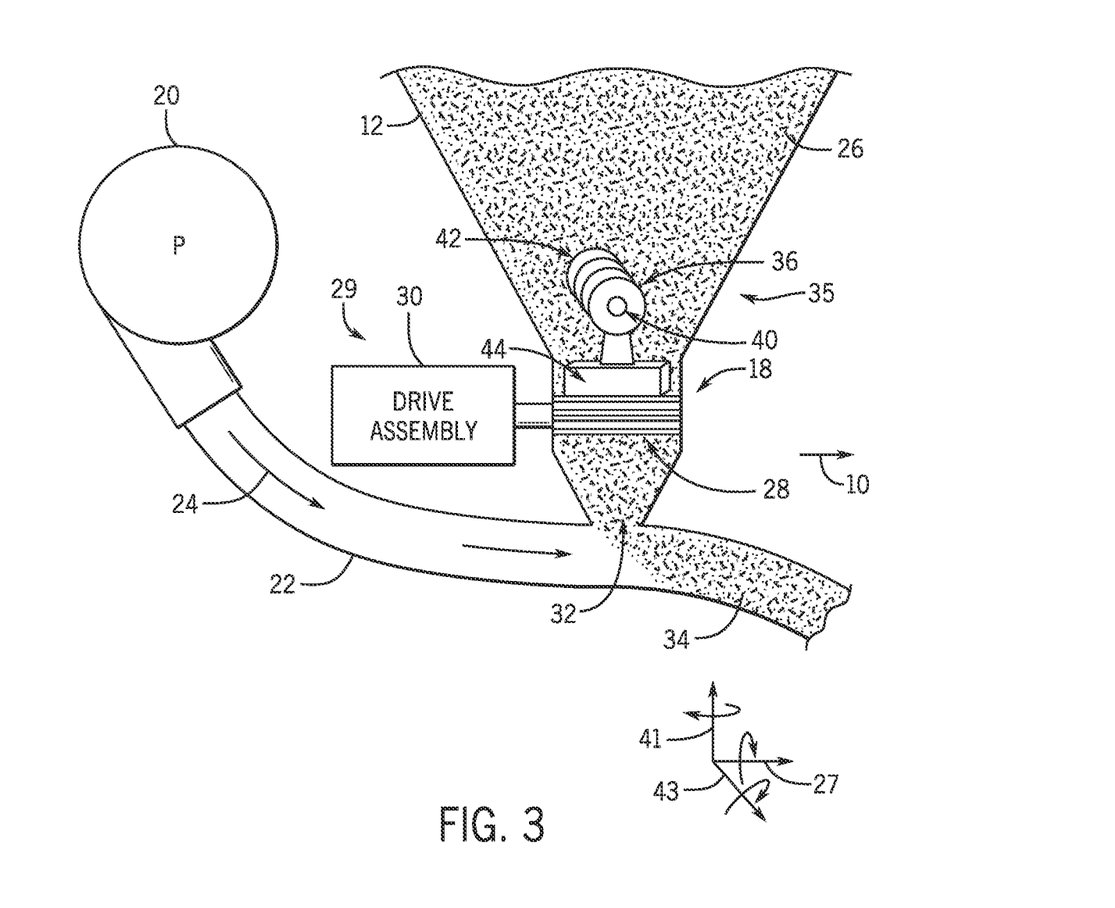
FIG. 3 is a schematic diagram of an embodiment of a metering system with a meter drive assembly and an embodiment of an agitation system with an agitator drive assembly coupled to the meter drive assembly, in accordance with an aspect of the present disclosure.

FIG. 3 is a schematic diagram of an embodiment of the metering system 18, which may be employed within the air cart 8 of FIG. 1. The metering system 18 includes multiple modular meters 29, and each modular meter 29 includes a meter roller 28 configured to regulate the flow of the agricultural product 26 into the air flow 24. In the illustrated embodiment, at least one meter drive assembly 30 of the metering system 18 is mechanically coupled to the shaft 40 of a respective modular agitator 36 via a power transfer system 44. Accordingly, the respective agitator 42 may be driven to move by the power transfer system 44 coupled with the respective meter roller 28, which is driven by the respective meter drive assembly 30. In the illustrated embodiment, the agitator 42 may rotate to move the agricultural product 26 within the storage compartment 12. The power transfer system 44 may be configured to drive the agitator 42 to rotate about one or more axes (e.g., the longitudinal axis 27, the vertical axis 41, the lateral axis 43) to move the agricultural product 26. For instance, the agitator 42 may be driven to rotate about an axis with a nonzero angle relative to the rotational axis of the meter roller 28, i.e., not parallel to the rotational axis of the meter roller. As used herein, nonzero angle may refer to an angle of about 1 to about 90 degrees, about 1 to about 45 degrees, about 1 to about 30 degrees, about 1 to about 15 degrees, or about 1 to about 5 degree relative to an axis/direction (e.g., the rotational axis of the meter roller). By way of example, nonzero angle may refer to an angle more than 5 degrees, more than 4 degrees, more than 3 degrees, more than 2 degrees, or more than 1 degree relative to an axis/direction (e.g., the rotational axis of the meter roller).

In certain embodiments, other suitable type(s) of agitators may be used in the agitation system. For example, at least one agitator may be driven to oscillate or move linearly within the storage compartment 12 to move the agricultural product 26. In such embodiments, the power transfer system 44 converts rotary movement of the meter roller 28 to linear movement of the agitator. The movement of the agitator could be linear and rotary, too. For example, the power transfer system 44 may include an adapter to covert the rotary movement of the meter roller 28 to linear movement of the agitator 42. Furthermore, the power transfer system 44 may include an adapter (e.g., a flexible shaft, a bevel gear, a worm gear, etc.) to convert the rotary movement of the meter roller 28 to a rotary movement of the agitator 42 about an axis with the nonzero angle relative to the rotational axis of the meter roller 28. By independently controlling each modular agitator, energy and other resources provided for agitator drive assemblies may be consumed more efficiently. Moreover, the individual controlling of the modular agitators may reduce the power utilized by the agitation drive motors.

Figure 4A:
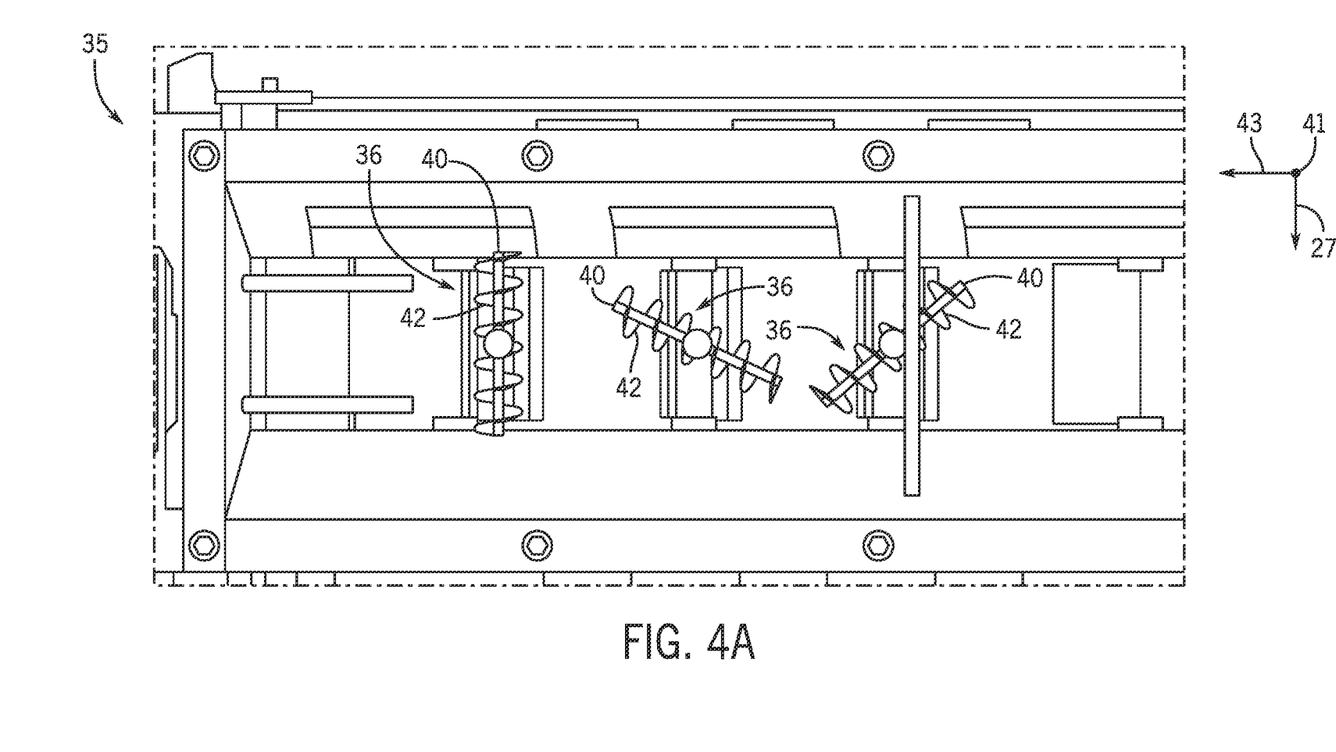
FIG. 4A is a top view of an embodiment of an agitation system with multiple modular agitators, in accordance with an aspect of the present disclosure.
Figure 4B:
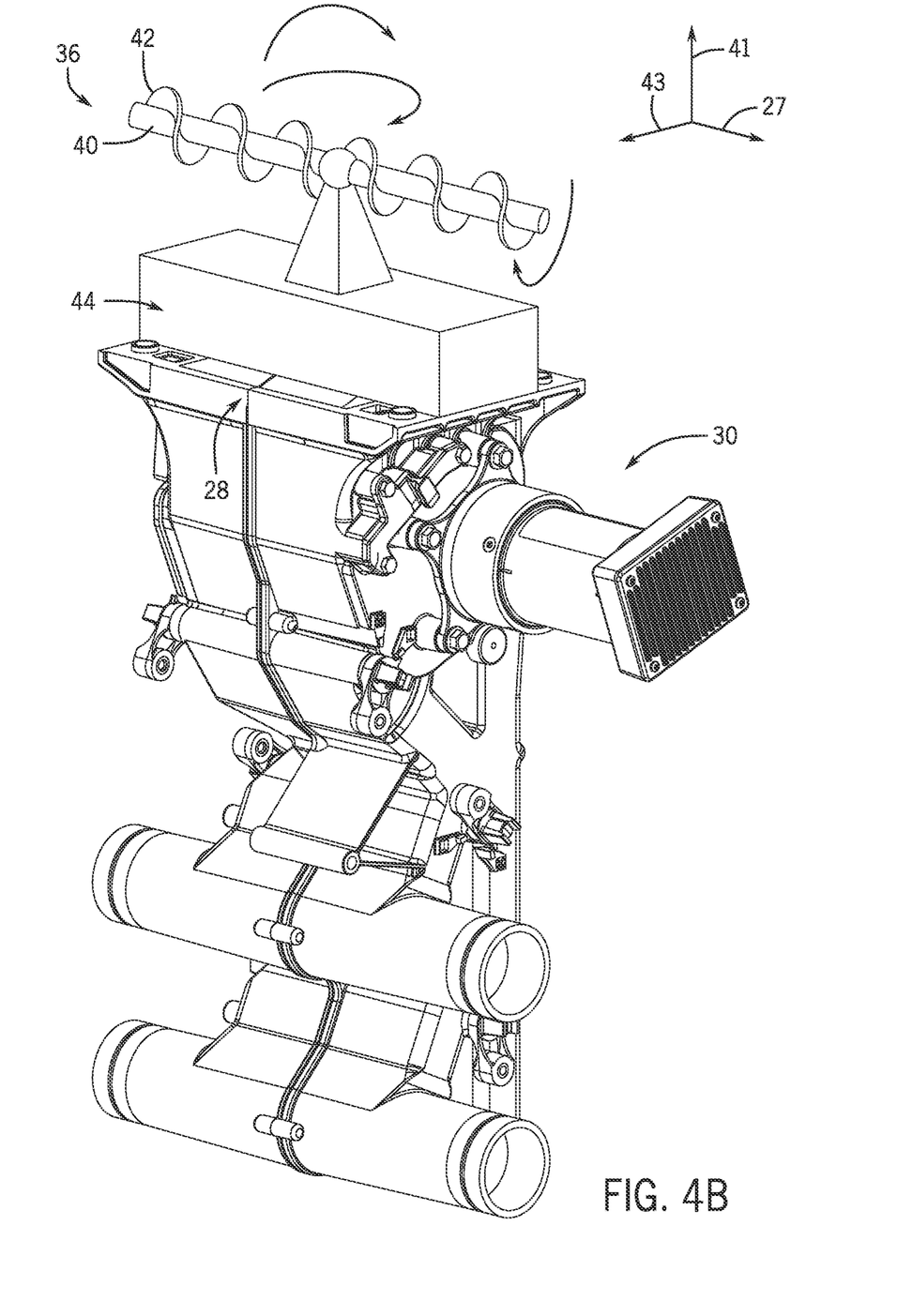
FIG. 4B is a perspective view of one modular agitator of the agitation system of FIG. 4A, in accordance with an aspect of the present disclosure.

In certain embodiments, the agitators 42 of multiple modular agitators 36 are disposed in the storage compartment, as illustrated in FIG. 4A. FIG. 4A is a top view of an embodiment of an agitation system 35 with multiple modular agitators 36. In addition, FIG. 4B is a perspective view of one modular agitator 36 of the agitation system 35 of FIG. 4A. In the illustrated embodiment, the agitators are configured to rotate about multiple axes, such as the longitudinal axis 27, the vertical axis 41, and the lateral axis 43. Furthermore, as previously discussed, the agitators may be located at the same vertical position or at different vertical positions within the storage compartment.

In the illustrated embodiment, the shaft 40 of each modular agitator 36 is coupled to a respective meter drive assembly through a respective power transfer system 44. In the illustrated embodiment, each agitator 42 includes a coil wrapped around the shaft 40. Accordingly, the agricultural product may flow between the shaft 40 and the coil of each agitator 42. Each power transfer system 44 may be configured to move the respective agitator 42 to different vertical positions (i.e., positions along the vertical axis 41), lateral positions (i.e., positions along the longitudinal axis 27), lateral positions (i.e., positions along the lateral axis 43), or a combination thereof, within the storage compartment. The power transfer system 44 could just move agitator based on the configuration of the power transfer system 44. In certain embodiments, the power transfer system 44 may be operated (e.g., automatically or by the operator) to move the respective agitator 42 to different positions within the storage compartment based on the type of the agricultural product and/or the state of the agricultural product (e.g., size of clumps or piles, location of piles, etc.) within the storage compartment. In certain embodiments, the power transfer system 44 may be configured to drive the agitator 42 to move (e.g., linearly along one or more axes and/or rotationally about one or more axes) based on the type of the agricultural product and the state of the agricultural product (e.g., size of clumps or piles, location of piles, etc.) within the storage compartment. By way of example, the power transfer system 44 may drive the agitator to rotate at different speeds while the respective meter roller 28 is driven to rotate at a constant speed. In certain embodiments, the power transfer system 44 may be controlled (e.g., automatically or by the operator) to control movement of the agitator 42 based on sensor data from one or more sensors (e.g., location sensor(s), motion sensor(s), weight sensor(s), sound sensor(s), image sensor(s), flow rate sensor(s), and the like).

In the illustrated embodiment, the agitation system 35 includes multiple modular agitators 36 to facilitate independent control of the agitation of the agricultural product above each modular meter. As previously discussed, for a particular meter roller configuration/profile, the rotation rate of the meter roller 28 controls the flow of the agricultural product into the air flow. In addition, the rotation rate of the meter roller 28, which is driven by a respective meter drive assembly, controls the movement of the agitator 42 of the respective modular agitator 36. In certain embodiments, a modular agitator may be operated to move the agricultural product into or away from the respective meter roller based on the state (e.g., size of clumps or piles, location of piles) of the agricultural product within the storage compartment. By way of example, the agitator 42 of one modular agitator 36 may rotate/translate in a way to distribute piled agricultural product away from the respective meter roller, while the agitator 42 of another modular agitator 36 may rotate/translate in a way to move the agricultural product into the respective meter roller. By independently controlling each modular agitator, the agricultural product within the storage compartment may be redistributed more efficiently.

Moreover, in certain embodiments, the metering system 18 may have more or fewer modular meters 29 and, based on a prescription map, only some of the modular meters 29 in the metering system 18 operate to meter the agricultural product in a region of the field, and the rest of the modular meters may be deactivated. In such embodiments, only respective modular agitators 36 may be activated to enhance flow of the particulate material to the corresponding operating modular meters 29, and the rest of the modular agitators 36 may not be activated. The power transfer systems 44 are clutched to activate/deactivate corresponding modular agitators 36. By independently controlling the power transfer systems 44 of each modular agitator 36 to activate/deactivate the corresponding modular agitator 36, energy and other resources provided for agitator drive assemblies may be consumed more efficiently. Moreover, the individual controlling of the power transfer systems 44 of the modular agitators 36 may reduce the power utilized by the agitation drive motors.

Figure 5:
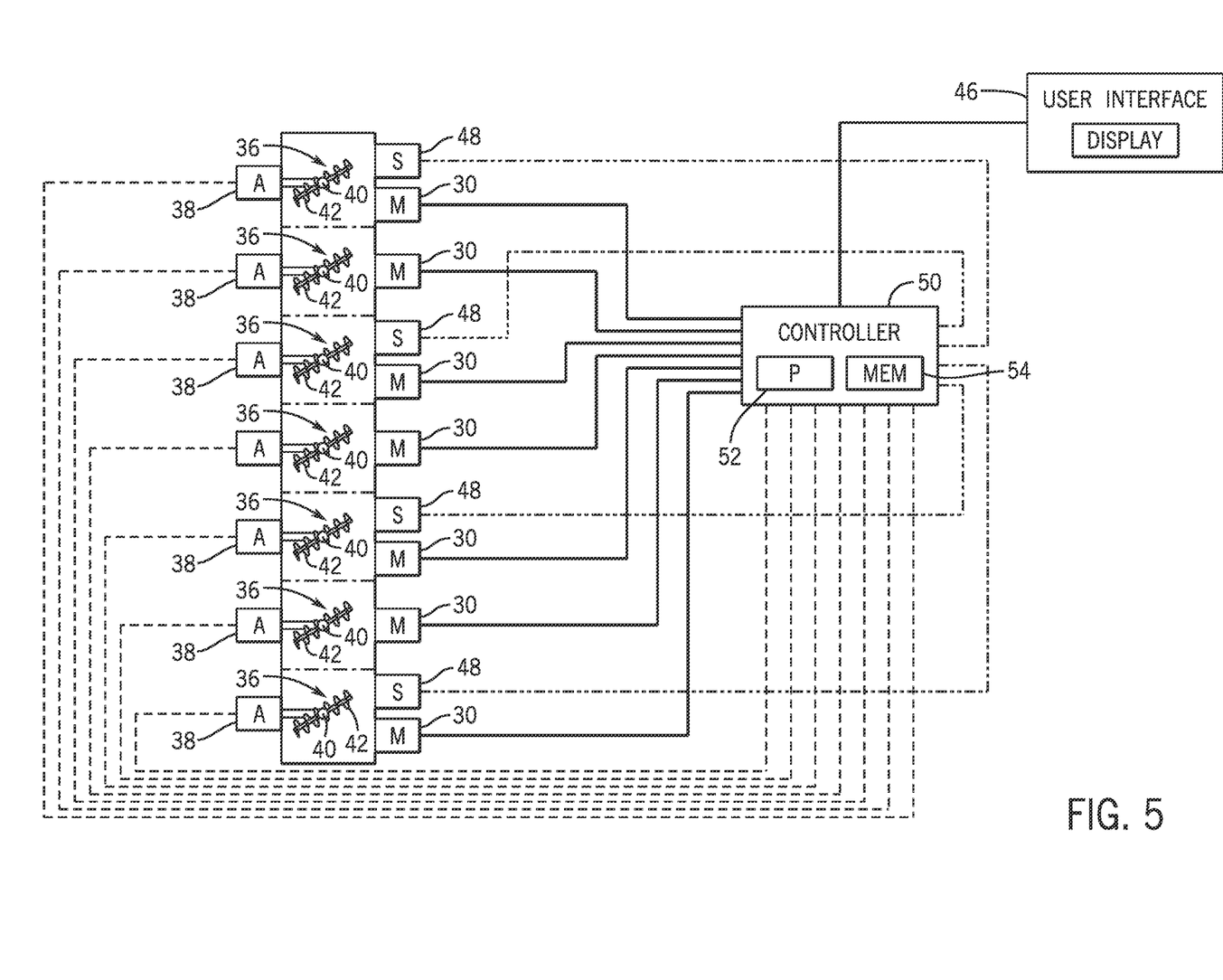
FIG. 5 is a schematic diagram of an embodiment of a metering system with multiple individual meter drive assemblies and an embodiment of an agitation system with multiple individual modular agitator drive assemblies, in accordance with an aspect of the present disclosure.

In certain embodiments, a controller may be used to control the operation of the meter rollers 28 and/or the modular agitators 36. FIG. 5 is a schematic diagram of an embodiment of a metering system with multiple individual meter drive assemblies 30 and an embodiment of an agitation system 35 with multiple individual agitator drive assemblies 38. In the illustrated embodiment, a controller 50 is communicatively coupled to the meter drive assemblies 30 and to the agitator drive assemblies 38. In addition, the controller 50 is communicatively coupled to a user display 46 and to sensor(s) 48 (e.g., location sensor(s), motion sensor(s), weight sensor(s), sound sensor(s), image sensor(s), flow rate sensor(s), torque sensor(s), and the like). In certain embodiments, the sensor(s) 48 may be disposed within the storage compartment, the opening to the conduit, the conduit, and other parts of the air cart/agricultural implement, or a combination thereof. The sensor(s) 48 may output data associated with the agricultural product and/or operation of the air cart/agricultural implement to the controller 50. The controller 50 may control operation of the meter rollers 28 and the modular agitators 36 based on data received from the sensor(s) 48. The controller 50 may control the meter rollers 28 and the modular agitators 36 by controlling respective meter drive assemblies 30 and respective agitator drive assemblies 38. For example, the controller 50 may receive data associated with the presence of the agricultural product from the sensor(s) 48. The controller 50 may control operation of each of the meter rollers 28 and each of the modular agitators 36 based on data received from the sensor(s) 48.

In certain embodiments, the controller 50 may include a processor 52 configured to execute software code or instructions stored on a memory 54. The term "software code" or "code" used herein refers to any instructions or set of instructions that influence the operation of the controller. The code may exist in a computer-executable form, such as machine code, which is the set of instructions and data directly executed by the processor of the controller, a human-understandable form, such as source code, which may be compiled in order to be executed by the processor of the controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by the processor of the controller.

Figure 6:
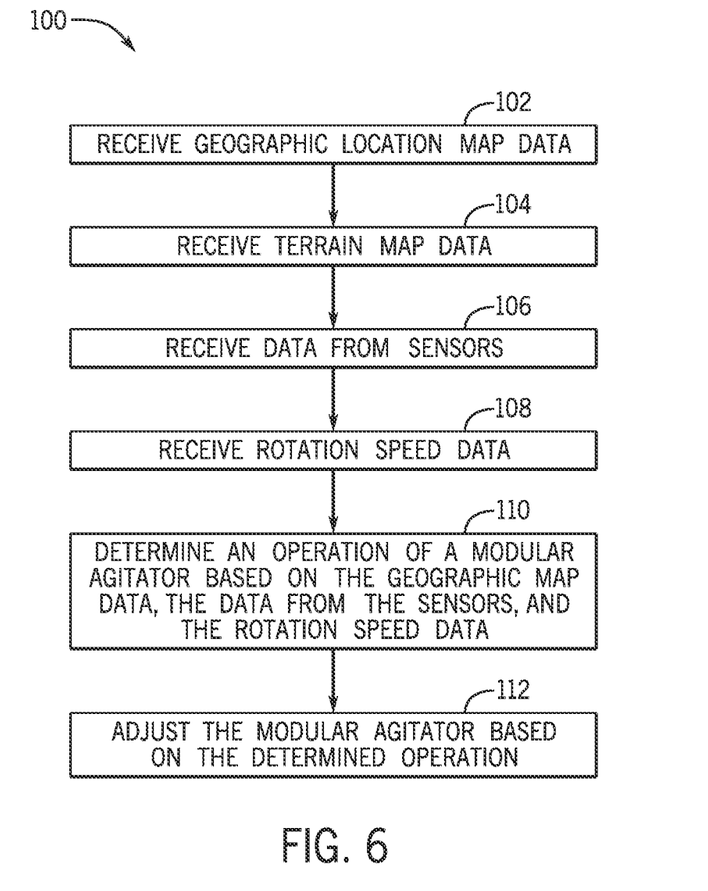
FIG. 6 is a flow diagram of an embodiment of a method of operating a metering system and an agitation system.

As an example, the memory 54 may store processor-executable software code or instructions (e.g., firmware or software), which are tangibly stored on a tangible computer readable medium. Additionally or alternatively, the memory 54 may store data (e.g., sensor data from the sensors 48). As an example, the memory 54 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 52 may include multiple microprocessors, one or more "general-purpose" microprocessors, one or more special-purpose microprocessors, and/or one or more application specific integrated circuits (ASICS), or some combination thereof. For example, the processor 52 may include one or more reduced instruction set (RISC) or complex instruction set (CISC) processors. The controller 50 could be one physical device or multiple physical devices FIG. 6 is a flow diagram of an embodiment of a method 100 for controlling an agitation system. The method 100 may be performed as an automated procedure by a system, such as the controller of FIG. 5. Although the flow diagram illustrates the steps in a certain sequence, the steps may be performed in any suitable order and/or certain steps may be carried out simultaneously, where appropriate. Further, certain step(s) of the method 100 may be omitted and/or additional steps may be added.

As shown, in step 102, a geographic location of the air cart/agricultural implement is received at the controller. As the air cart/agricultural implement moves across the field, the controller may receive signal(s) indicative of the geographic location of the air cart/agricultural implement via location sensor(s) and/or any other suitable sensor(s). The location sensor(s) may be disposed on a tractor towing the air cart/agricultural implement, and the location of the air cart/agricultural implement may be determined based on data related to the location of the air cart/agricultural implement relative to the location sensor(s) on the tractor. In certain embodiments, the location sensor(s) may be disposed on the air cart/agricultural implement or other suitable location(s) on the agricultural system. In some embodiments, multiple location sensors may be disposed on the air cart/agricultural implement.

In step 104, a terrain map, or signal(s) indicative of the terrain map for various region(s) of the field, is received at the controller 50. The terrain map may be input by the operator directly into the user interface, or the terrain map may be received from an external device (e.g., computing device, public record) via a wired or wireless connection, for example. In certain embodiments, the terrain map may be generated by the controller based on parameter(s) (e.g., received from detecting devices, such as image sensors) associated with the various region(s) of the field. The controller may determine the profile of the agricultural product within the storage compartment based on the terrain map and the location of the storage compartment. For example, for a hill region, the agricultural product inside the storage compartment may tend to accumulate in a certain part of the storage compartment, which may be determined based on the slope of the hill.

In step 106, data from the sensor(s) (e.g., location sensor(s), motion sensor(s), weight sensor(s), sound sensor(s), image sensor(s), flow rate sensor(s), and the like) may provide one or more parameters, such as the profile and quantity of the agricultural product within the storage compartment. The sensor(s) 48 may be disposed within the storage compartment, the opening to the conduit, the conduit, other part(s) of the air cart/agricultural implement, or a combination thereof. The controller may control the modular agitators based on respective locations of the modular agitators and the data from the sensor(s) 48 to redistribute the agricultural product within the storage compartment.

In step 108, the controller may receive rotation speed data indicative of the rotation speed of each of the meter rollers. The meter rollers in the metering system may be controlled (e.g., to meter the agricultural product from the storage compartment at a desired product flow rate) to operate at certain rotation speed(s). In certain embodiments, the metering system includes one or more meter rollers configured to control the flow of agricultural product into the air flow. In certain embodiments, the metering system may include multiple meter rollers (e.g., housed within individual meter boxes) disposed adjacent to one another. By independently controlling the rotation speed of each meter roller, product flow to different portions of the implement may be independently controlled. In these embodiments, the controller may control operation of each modular agitator based on the rotation speed of each respective meter roller.

In step 110, the controller may determine operation for each modular agitator based on the geographic location, the terrain map, the data from the sensor(s), the rotation speed of the respective meter roller, or a combination thereof. The geographic location may be used to determine the positions (e.g., relative to the terrain map) of the sections of the implement that receive agricultural product from respective meter rollers associated with respective modular agitators; the terrain map may be used together with the data from the sensors to determine the state (e.g., size of clumps or piles, location of piles, etc.) of the agricultural product within the storage compartment; and the rotation speed of the meter rollers may be used to determine the rotation/oscillation/movement speed of the agitators. In certain embodiments, the controller may determine to move one or more agitators to different location(s) within the storage compartment. For example, the controller may move a modular agitator from a position with less or no agricultural product to a position with more or piled agricultural product to facilitate redistribution of the agricultural product within the storage compartment. In certain embodiments, the controller may determine to adjust the rotation speed(s) of one or more agitators when the rotation speed(s) of respective meter roller(s) change (e.g., due to respective section(s) of the implement moving to different region(s) of the field). In certain embodiments, the controller may determine to operate a particular agitator to move the agricultural product toward or away from a location inside the storage compartment. By way of example, the controller may determine to operate a modular agitator to distribute the piled agricultural product to one or more meter rollers for metering.

In certain embodiments, the metering system may include multiple meter rollers, and the agitation system may include multiple corresponding modular agitators. In these embodiments, the controller may determine the operation for each modular agitator based on the geographic location of the corresponding section of the implement, the terrain map, the data from the sensor(s), the rotation speed of the respective meter roller, or a combination thereof. In certain embodiments, each modular agitator may be operated independently to move the agricultural product into or away from a respective meter roller based on the state (e.g., size of clumps or piles, location of piles, etc.) of the agricultural product inside the storage compartment. By way of example, the controller may determine that the agitator of a modular agitator is to rotate/operate in a way to distribute piled agricultural product away from the respective meter roller, while the agitator of another modular agitator is to rotate/operate in a way to move the agricultural product toward/into the respective meter roller for metering.

In certain operating conditions (e.g., based on the prescription map), only some of the multiple meter rollers may be activated to meter the agricultural product from the storage compartment to regions of the field, and the rest of the multiple meter rollers may be deactivated. In these operating conditions, the controller may determine the modular agitators to be activated to facilitate operating the respective meter rollers for metering, and determine the modular agitators to be deactivated. By using the controller to independently control each modular agitator, energy and other resources provided for the agitator drive assemblies may be reduced (e.g., as compared to operating a single agitator that spans all of the modular meter inlets).

The controller may utilize one or more algorithms, look up tables, models, empirical data, historical data (e.g., acquired by the sensor(s)), or a combination thereof, to determine the operation of the modular agitators based on certain parameters, such as product type, current product load in the storage compartment, implement type, certain agricultural system characteristics (e.g., product distribution line length, etc.), a size of the headlands or other regions with zero product prescribed, a drive time to and/or an expected time of travel through the headland regions or other regions with zero product prescribed, or a combination thereof. For example, the controller may reduce or stop the operation of each modular agitator 36 within a region with zero product prescribed.

In step 112, the controller may output a control signal to each agitator drive assembly indicative of one or more determined operations of the respective agitator. In certain embodiments, the controller may output a notification to the user interface, and an operator may confirm or select the operation(s) for the modular agitators.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agitation system, comprising:
a plurality of modular agitators, wherein each modular agitator of the plurality of modular agitators comprises:
an agitator configured to be aligned with an inlet of a respective modular meter of a plurality of modular meters; and
an agitator drive assembly configured to drive the agitator, to operate independently of a meter of the respective modular meter;
a controller comprising a memory and a processor, wherein the controller is configured to:
receive meter speed data from the plurality of modular meters, wherein the meter speed data comprise a meter speed for each meter of the plurality of modular meters;
determine an operation for the agitator of each of the plurality of modular agitators based directly on the meter speed data; and
independently control the agitator drive assembly of each of the plurality of modular agitators to operate the respective agitator in the respective determined operation.

2. The agitation system of claim 1, wherein the operation for the respective agitator of each of the plurality of modular agitators is determined based on the meter speed of the respective modular meter having the inlet aligned with the agitator.

3. The agitation system of claim 1, wherein the controller is configured to determine the operation for the agitator of each of the plurality of modular agitators based on a respective location of an implement section that receives an agricultural product from the respective modular meter having the inlet aligned with the agitator.

4. The agitation system of claim 1, wherein the controller is configured to determine the operation for the agitator of each of the plurality of modular agitators based on an agricultural product type.

5. The agitation system of claim 1, wherein the controller is configured to determine the operation for the agitator of each of the plurality of modular agitators based on a terrain map for a field.

6. The agitation system of claim 1, comprising a plurality of sensors configured to monitor one or more parameters of an agricultural product, and the controller is configured to determine the operation for the agitator of each of the plurality of modular agitators based on the one or more parameters.

7. The agitation system of claim 6, wherein the plurality of sensors comprise a weight sensor, an image sensor, a flow rate sensor, a force or torque sensor or any combination of them.

8. The agitation system of claim 1, wherein the controller is configured to determine the operation for the agitator of each of the plurality of modular agitators based directly on the meter speed data and at least one of sensor data indicative of a profile and a quantity of an agricultural product within a storage compartment or geographic map data.

9. A computer readable medium comprising executable instructions that, when executed by a processor, are configured to cause the processor to:
receive meter speed data from a plurality of modular meters, wherein the meter speed data comprises a meter speed for each meter of the plurality of modular meters;
determine an operation for a respective agitator of each of a plurality of modular agitators based directly on the meter speed data, wherein each modular agitator of the plurality of modular agitators comprises:
an agitator configured to be aligned with an inlet of a respective modular meter of the plurality of modular meters; and
an agitator drive assembly configured to drive the agitator to operate independently of a meter of the respective modular meter; and
independently control the agitator drive assembly of each of the plurality of modular agitators to operate the respective agitator in the respective determined operation.

10. The computer readable medium of claim 9, wherein the operation for the respective agitator of each of the plurality of modular agitators is determined based on the meter speed of the respective modular meter having the inlet aligned with the agitator.

11. The computer readable medium of claim 9, wherein the processor is configured to determine the operation for the agitator of each of the plurality of modular agitators based on a respective location of an implement section that receives an agricultural product from the respective modular meter having the inlet aligned with the agitator.

12. The computer readable medium of claim 9, determine the operation for the agitator of each of the plurality of modular agitators based on an agricultural product type.

13. The computer readable medium of claim 9, wherein the processor is configured to determine the operation for the agitator of each of the plurality of modular agitators based on a terrain map for a field.

14. The computer readable medium of claim 9, wherein the processor is configured to determine the operation for the agitator of each of the plurality of modular agitators based on one or more parameters of an agricultural product, wherein a plurality of sensors configured to monitor the one or more parameters.

15. An agitation system, comprising:
a plurality of modular meters, wherein each modular meter of the plurality of modular meters comprises a respective meter roller configured to regulate a flow of an agricultural product; and
a plurality of modular agitators, wherein each of the plurality of modular agitators comprises a respective agitator coupled to the respective meter roller of a corresponding modular meter of the plurality of modular meters via a respective power transfer system disposed between the respective meter roller and the respective agitator and configured to convert a first movement of the respective meter roller to a second movement of the respective agitator, and the respective power transfer system is configured to drive the respective agitator of the respective modular agitator about an axis oriented at a nonzero angle relative to a rotational axis of the respective meter roller.

16. The agitation system of claim 15, comprising:
a plurality of meter drive assemblies, each configured to drive the respective meter roller of a respective modular meter of the plurality of modular meters to rotate; and
a controller communicatively coupled to the plurality of meter drive assemblies and configured to independently control each respective meter drive assembly of the plurality of meter drive assemblies.

17. The agitation system of claim 15, wherein the respective power transfer system is configured to operate the agitator of each of the plurality of modular agitators based on a respective location of an implement section that receives the agricultural product from the modular meter associated with the respective power transfer system.

18. The agitation system of claim 15, wherein the respective power transfer system is configured to operate the agitator of each of the plurality of modular agitators based on an agricultural product type.

19. The agitation system of claim 15, wherein the respective power transfer system is configured to operate the agitator of each of the plurality of modular agitators based on a terrain map for a field.

20. The agitation system of claim 15, comprises a plurality of sensors configured to measure one or more parameters of the agricultural product, and wherein the respective power transfer system is configured to operate the agitator of each of the plurality of modular agitators based on the one or more parameters.

* * * * *